(12) United States Patent
Chiu et al.

(10) Patent No.: US 11,873,975 B2
(45) Date of Patent: Jan. 16, 2024

(54) BACKLIGHT MODULE AND DISPLAY DEVICE

(71) Applicant: Radiant Opto-Electronics Corporation, Kaohsiung (TW)

(72) Inventors: Yi-Jen Chiu, Kaohsiung (TW);
Sung-Fu Wu, Kaohsiung (TW);
Jung-Yin Chang, Kaohsiung (TW);
Ya-Yin Tsai, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/188,479

(22) Filed: Mar. 23, 2023

(65) Prior Publication Data
US 2023/0383928 A1 Nov. 30, 2023

Related U.S. Application Data

(63) Continuation of application No. PCT/CN2022/094623, filed on May 24, 2022.

(51) Int. Cl.
*F21V 19/00* (2006.01)
*F21Y 115/10* (2016.01)

(52) U.S. Cl.
CPC ....... *F21V 19/0015* (2013.01); *F21Y 2115/10* (2016.08)

(58) Field of Classification Search
CPC .................................................. F21V 19/0015
See application file for complete search history.

(56) References Cited

U.S. PATENT DOCUMENTS

| 2007/0253221 A1* | 11/2007 | Tsai | G02B 6/0088 |
| | | | 362/633 |
| 2008/0088771 A1* | 4/2008 | Hung | G02B 6/0086 |
| | | | 362/621 |
| 2008/0100769 A1* | 5/2008 | Hsiao | G02F 1/133308 |
| | | | 349/58 |

(Continued)

FOREIGN PATENT DOCUMENTS

| CN | 103148459 A | 6/2013 |
| CN | 208013629 U | 10/2018 |

(Continued)

*Primary Examiner* — Christopher E Dunay

(57) ABSTRACT

A backlight module comprises a back frame with at least one perforation, a light board arranged on the back frame, a plurality of light-emitting elements arranged on the light board at intervals, a fixing frame combined with the back frame, and a plurality of optical films stacked on the fixing frame. The light board has at least one through portion, and the position of the through portion corresponds to the at least one perforation of the back frame. A part of the fixing frame is positioned in the at least one perforation of the back frame through the at least one through portion of the light board. The effect of a narrow frame can be effectively achieved by arranging the joint part of the fixing frame and the back frame on the inner side of the back frame and forming the through portion on the edge of the light board to be engaged with the joint part of the fixing frame and the back frame. The present invention also provides a display device comprising the backlight module.

11 Claims, 7 Drawing Sheets

(56) References Cited

U.S. PATENT DOCUMENTS

| | | | |
|---|---|---|---|
| 2008/0111940 A1* | 5/2008 | Chang | G02F 1/133308 |
| | | | 349/58 |
| 2008/0129921 A1* | 6/2008 | Huang | G02F 1/133308 |
| | | | 349/60 |
| 2010/0165642 A1* | 7/2010 | Hsieh | H05K 7/142 |
| | | | 361/752 |
| 2019/0137828 A1* | 5/2019 | Aruga | G02B 6/0088 |
| 2019/0204678 A1 | 7/2019 | Hosoki | |

FOREIGN PATENT DOCUMENTS

| | | |
|---|---|---|
| CN | 217544072 U | 10/2022 |
| JP | 2013131311 A | 7/2013 |
| JP | 3236201 U | 2/2022 |
| TW | 201007276 A | 2/2010 |
| TW | 202008049 A | 2/2020 |
| WO | 2016045147 A1 | 3/2016 |

* cited by examiner

BACKLIGHT MODULE AND DISPLAY DEVICE

RELATED APPLICATIONS

This application is a continuation application of International Application No. PCT/CN2022/094623, filed on May 24, 2022, which claims priority to China Application Serial Number 202210261726.5, filed on Mar. 17, 2022. The entire disclosures of all the above applications are hereby incorporated by reference.

FIELD OF THE INVENTION

The present invention relates to an optical element, particularly a backlight module and a display device.

BACKGROUND OF THE INVENTION

Conventional display devices generally include a display panel and a backlight module, and a frame component is provided to fix the backlight module and connect the display panel. In addition, the conventional display devices are mainly designed to be thinner and larger. Especially, the narrow bezel display, not only has an aesthetic function, but also can increase the display area of the display device.

However, the assembly of the narrow bezel display requires high assembly accuracy. Once there is a slight error in the size of the parts, it will increase the difficulty of assembly. In addition, as far as the current mass production technology is concerned, the light boards used in direct-lit backlight modules mostly use POB (Package on Board) light boards, which use larger mini-LEDs. However, in response to market trends, finer local dimming effect is required to make the screen display have better performance of colors and contrasts. Therefore, a direct-lit mini-LED backlight module is assembled with smaller mini-LEDs, PCB light boards and other components. In addition, due to the narrow frame design, the distribution of mini-LEDs on the circuit board must also consider the distance between the mini-LEDs and the edge of the circuit board to reduce the width of the invalid area of the frame.

Therefore, how to achieve a narrow frame design and increase the fixing effect of the frame at the same time is a problem that needs to be solved.

SUMMARY OF THE INVENTION

One object of the present invention is to provide a backlight module with a narrow frame.

The backlight module comprising a back frame with at least one perforation, a light board arranged on the back frame, a plurality of light-emitting elements arranged on the light board at intervals, a fixing frame combined with the back frame, and multiple optical films stacked on the fixing frame. The light board has at least one through portion, and the position of the at least one through portion corresponds to the position of the at least one perforation of the back frame. A part of the fixing frame is positioned in the at least one perforation of the back frame through the at least one through portion of the light board.

In a preferable embodiment, the back frame includes a body part and a side wall part arranged on the body part, the body part and the side wall part jointly surround an accommodating space, and the light board is arranged on the body part and located in the accommodating space, wherein the at least one perforation of the back frame is provided at the junction of the body part and the side wall part.

In a preferable embodiment, the fixing frame includes a frame body, at least one positioning portion extending from the frame body, and at least one hook portion disposed at the end of the positioning portion, the at least one positioning portion and the at least one hook portion of the fixing frame extend into the at least one perforation of the back frame, and the at least one hook portion is engaged with the side wall part of the back frame.

In a preferable embodiment, the hook portion of the fixing frame protrudes toward the side wall part of the back frame and extends into the at least one perforation of the back frame and abuts against the side wall part.

In a preferable embodiment, the frame body of the fixing frame is carried on the side wall part of the back frame, and the at least one positioning portion of the fixing frame extends inner side of the side wall part of the back frame and located in the accommodating space.

In a preferable embodiment, the fixing frame includes a frame body, and at least one positioning portion extending from the frame body toward the light board, and the at least one positioning portion passes through the at least one through portion of the light board and is positioned in the at least one perforation of the back frame.

In a preferable embodiment, the fixing frame also has at least one space formed on one side of the at least one positioning portion, so that the at least one positioning portion can be deformed relative to the frame body.

In a preferable embodiment, the surface of the fixing frame facing the accommodating space of the back frame is a white surface.

In a preferable embodiment, the backlight module further includes a reflective sheet, and a part of the reflective sheet is arranged on the frame body of the fixing frame.

In a preferable embodiment, the at least one through portion of the light board is recessed inwardly from the edge of the light board.

In a preferable embodiment, the light-emitting elements are arranged in an array on the light board, and the at least one through portion is located between adjacent light-emitting elements.

Another object of the present invention is to provide a display device which comprises the backlight module as described above, and a display panel arranged on the backlight module.

The characteristic of the present invention is that the effect of a narrow frame can be effectively achieved by arranging the joint part of the fixing frame and the back frame on the inner side of the back frame and forming the through portion on the edge of the light board to be engaged with the joint part of the fixing frame and the back frame. In addition, the edge of the light board can be closer to the fixing frame and the back frame, which can further enlarge the light-emitting area of the display device.

DETAILED DESCRIPTION OF THE INVENTION

The detailed description and preferred embodiments of the invention will be set forth in the following content and provided for people skilled in the art to understand the characteristics of the invention.

Figure 1:
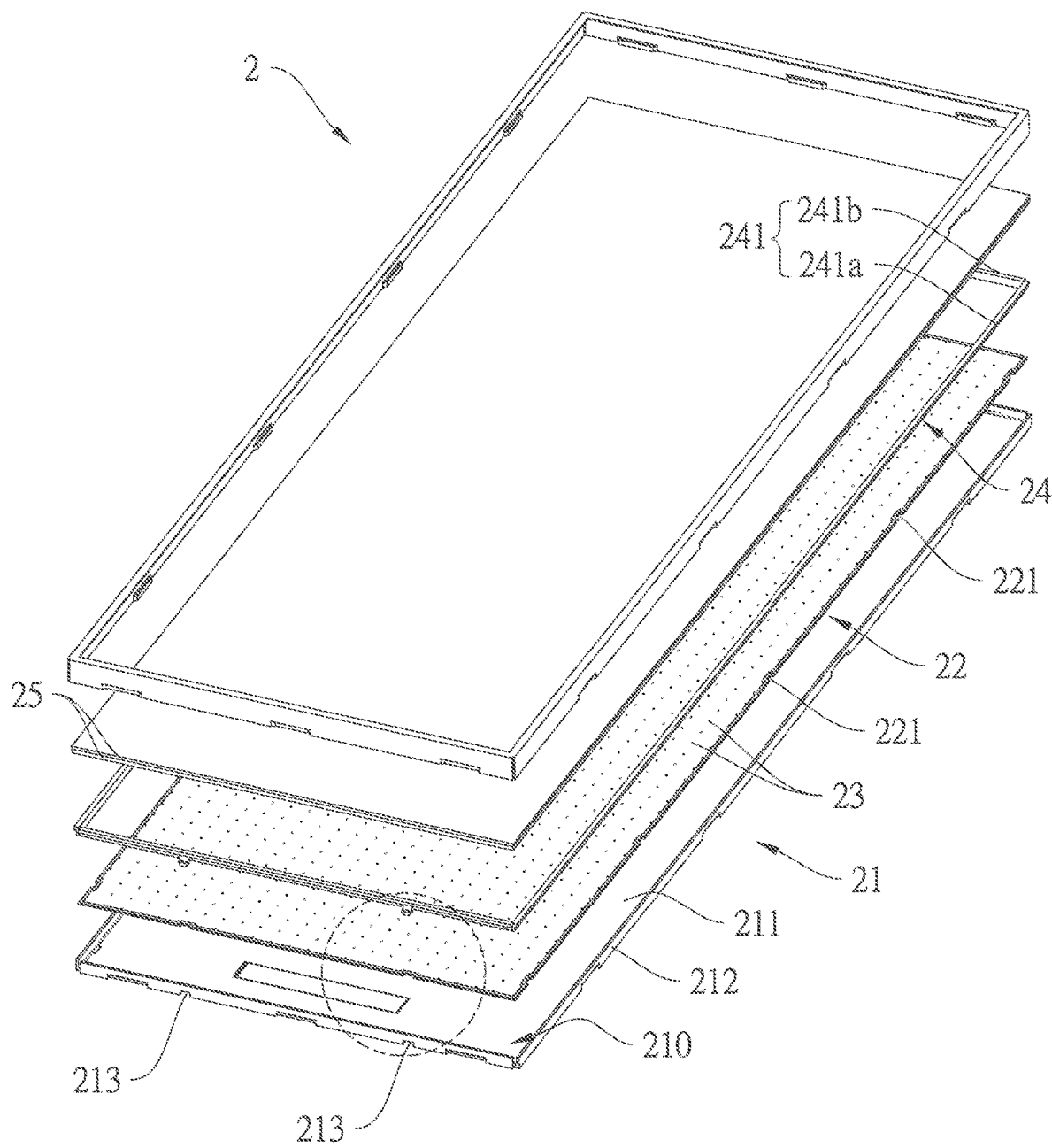
FIG. 1 is an exploded diagram of a backlight module according to a preferred embodiment of this invention.

Referring to FIG. 1, it is a preferred embodiment of the backlight module 2 of the present invention. The backlight module 2 comprises a back frame 21, a light board 22 arranged on the back frame 21, a plurality of light-emitting elements 23 arranged at intervals on the light board 22, a fixing frame 24 combined with the back frame 21, and a plurality of optical films 25 stacked on the fixing frame 24. Each of the optical films 25 can be a diffusion plate, a diffusion film, or a prism sheet, but it is not limited to the description of this embodiment. In this embodiment, the back frame 21 is formed with a plurality of perforations 213, the light board 22 has a plurality of through portions 221, and the positions of the through portions 221 are corresponding to the perforations 213 of the back frame 21. A part of the fixing frame 24 is positioned in the perforations 213 of the back frame 21 through the through portions 221 of the light board 22. Therefore, the effect of positioning and engaging between the light board 22, the back frame 21, and the fixing frame 24 can be achieved by forming the through portion 221 on the edge of the light board 22 and the corresponding perforation 213 of the back frame 21 to be engaged with the partial structure of the fixing frame 24. In addition, the effect of a narrow frame can be effectively achieved by arranging the joint part of the fixing frame 24 and the back frame 21 on the inner side of the back frame 21 and forming the through portion 221 on the edge of the light board 22 to be engaged with the joint part of the fixing frame 24 and the back frame 21. Moreover, the edge of the light board 22 can be closer to the fixing frame 24 and the back frame 21, which can further enlarge the light-emitting area of the display device.

The back frame 21 includes a body part 211 and a side wall part 212 arranged on the periphery of the body part 211. The body part 211 and the side wall part 212 jointly surround an accommodating space 210. In this embodiment, the perforations 213 are arranged at the junction of the body part 211 and the side wall part 212 and are spaced from each other.

Referring to FIG. 1 to FIG. 4, the fixing frame 24 includes a frame body 241, at least one positioning portion 242 extending from the frame body 241 toward the direction of the lamp board 22, and at least one hook portion 243 disposed at the end of the positioning portion 242. In this embodiment, the number of the positioning portion 242 and the hook portion 243 is plural. Each of the positioning portion 242 extends from the frame portion 241, and the hook portions 243 are respectively disposed at the ends of the positioning portions 242. The frame body 241 has two long sides 241a and two short sides 241b, and the positioning portions 242 are disposed on one of the short sides 241b. The frame body 241 of the fixing frame 24 is carried on the side wall part 212 of the back frame 21, and the width of the frame body 241 is slightly wider than the width of the side wall part 212. Each of the positioning portion 242 extends along the inner side of the side wall part 212 and is located in the accommodating space 210 and is not limited by the width of the frame body 241 or the side wall part 212. In addition, each hook portion 243 is located at the end of the corresponding positioning portion 242, so its engaging area will not be limited by the width or thickness of the side wall part 212, and the engaging stability is better. Compared with the prior art, some hooks are designed on the surface of the side wall of the frame, and the contact area is also narrow due to the small load-bearing area of the side wall surface, which is prone to the disadvantage of insufficient stability.

Figure 2:
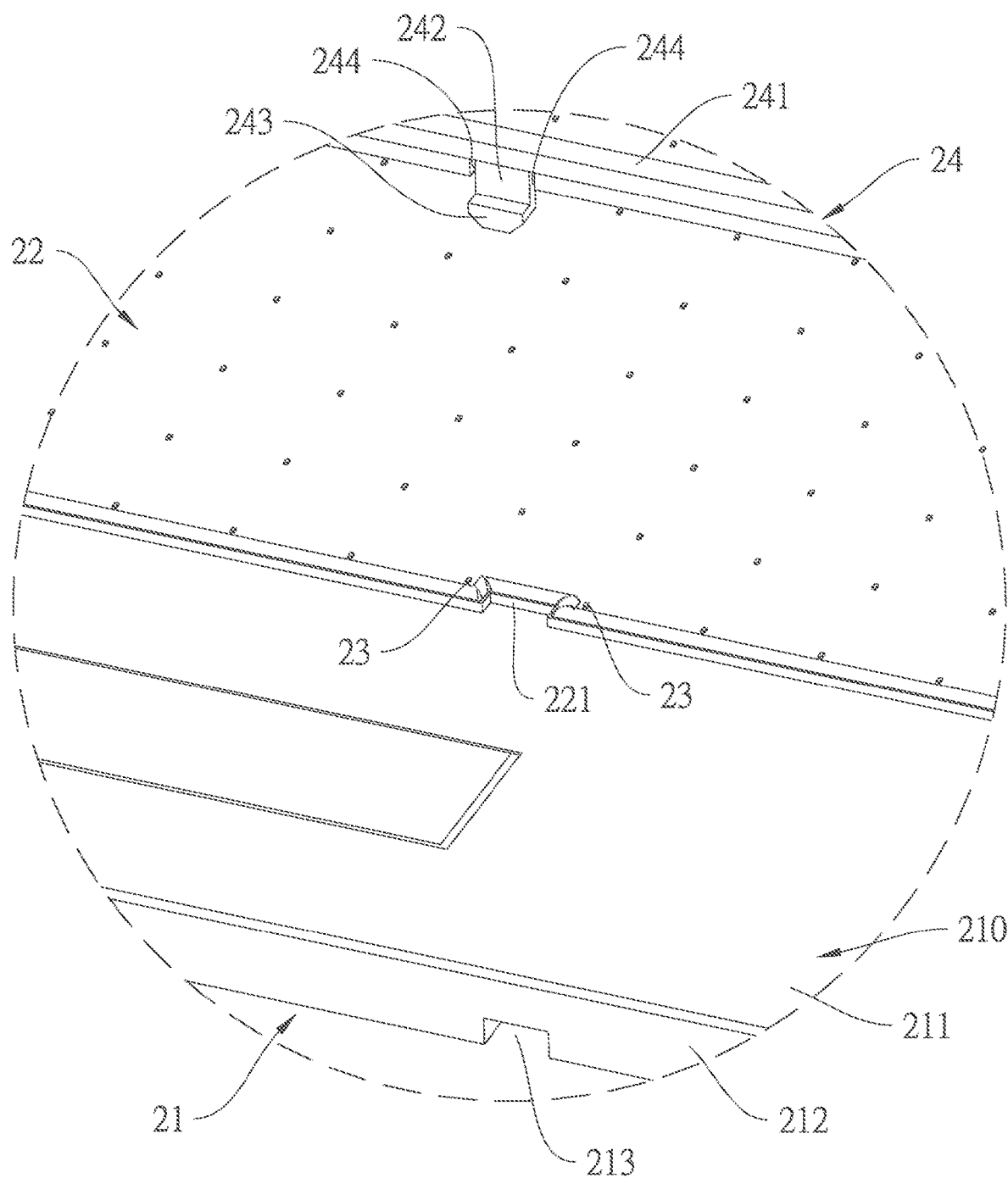
FIG. 2 is a partial enlarged diagram to assist in explaining FIG. 1.
Figure 3:
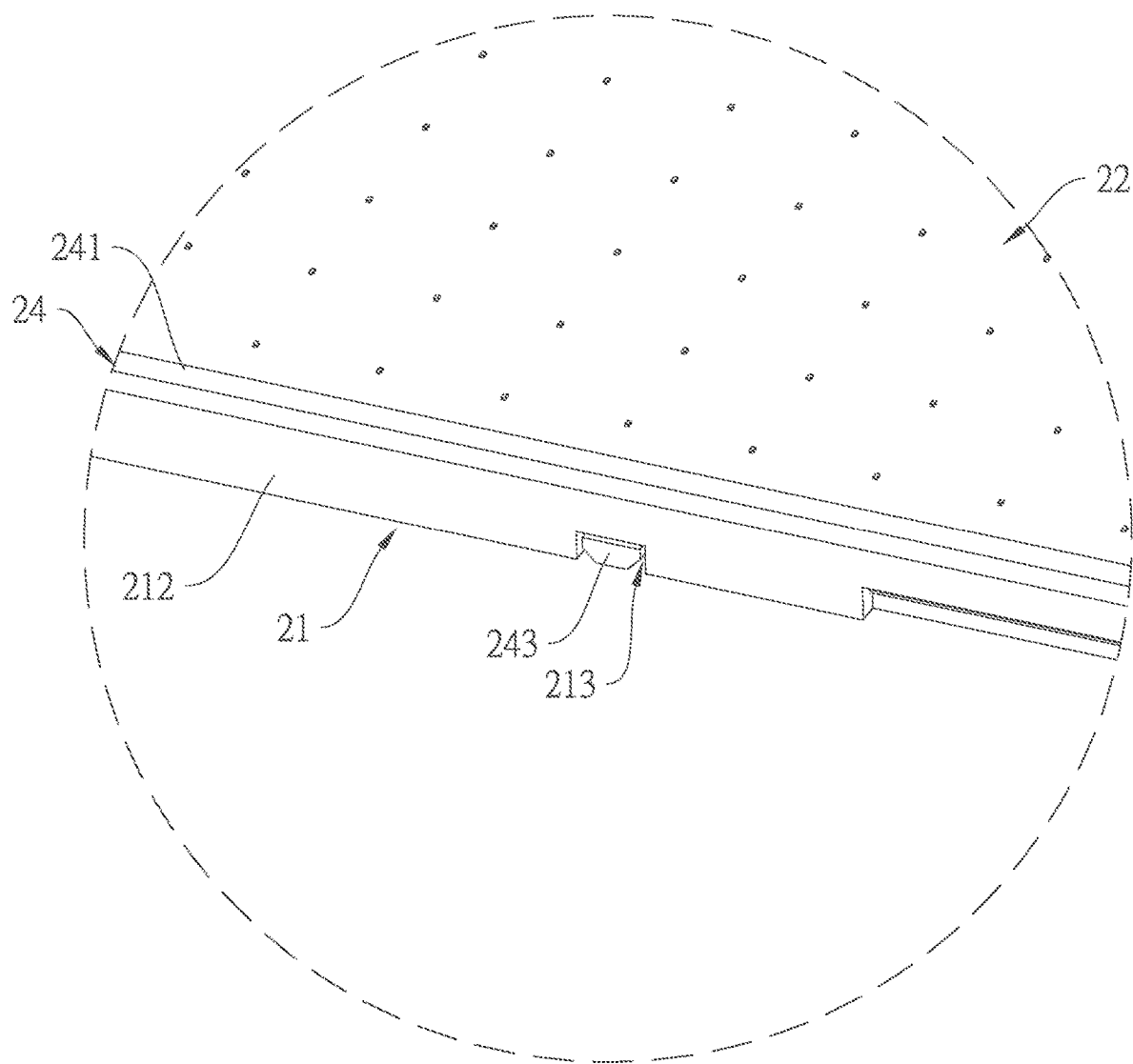
FIG. 3 is a perspective diagram illustrating the assembled structure of FIG. 2.

Referring to FIG. 2, when the back frame 21 and the fixing frame 24 are to be assembled, the light board 22 is first placed on the body part 211 of the back frame 21, and the through portions 221 of the light board 22 are aligned with the perforations 213 of the back frame 21. Next, the fixing frame 24 is assembled on the back frame 21. Wherein, the positioning portions 242 of the fixing frame 24 pass through the through portions 221 of the light board 22 respectively and then extend to be positioned in the perforations 213 of the back frame 21. More specifically, to enhance the effect of positioning and engagement, the end of each positioning portion 242 is formed with the hook portion 243, and the hook portion 243 protrudes toward the side wall part 212 of the back frame 21. The perforations 213 of the back frame 21 are provided at the junction of the body part 211 and the side wall part 212. Therefore, after each of the positioning portion 242 is placed in the corresponding perforation 213, the hook portion 243 at the end of the positioning portion 242 will abut against the side wall part 212 of the back frame 21 and interfere with the side wall part 212 to be engaged and assembled into a structure as shown in FIG. 3 and FIG. 4.

As shown in FIG. 2, the fixing frame 24 is also formed with at least one space, which is formed on one side of the at least one positioning portion 242, so that the at least one positioning portion 242 can be deformed relative to the frame body 241. In this embodiment, at least one space is a plurality of gaps 244, and the gaps 244 are respectively formed on two sides of each of the positioning portions 242 and extend in the same direction as the positioning portions 242. With this design, when the fixing frame 24 is assembled to the back frame 21 from top to bottom, each of the hook portions 243 will be pushed against by the side wall part 212 because it protrudes toward the side wall part 212. At the same time, due to the existence of the gaps 244, each of the positioning portions 242 and the hook portion 243 at the end thereof can generate an elastic restoring force. When the fixing frame 24 is assembled, each of the hook portion 243 is no longer pushed by the side wall part 212 and releases the elastic restoring force in the corresponding perforation 213 of the back frame 21, thus having a better positioning and combining effect. When the fixing frame 24 is going to be disassembled, each of the positioning portions 242 can be pulled relative to the frame body 241, and then each of the hook portions 243 is disengaged from the side wall part 212 of the back frame 21, and it is convenient to disassemble the fixing frame 24 for rework. In other embodiments, the at least one positioning portion 242 can also be designed as a single protruding shape with space left on its side, which also enables the at least one positioning portion 242 to be deformed relative to the frame portion 241. Therefore, it is not limited to the description of this embodiment.

Figure 4:
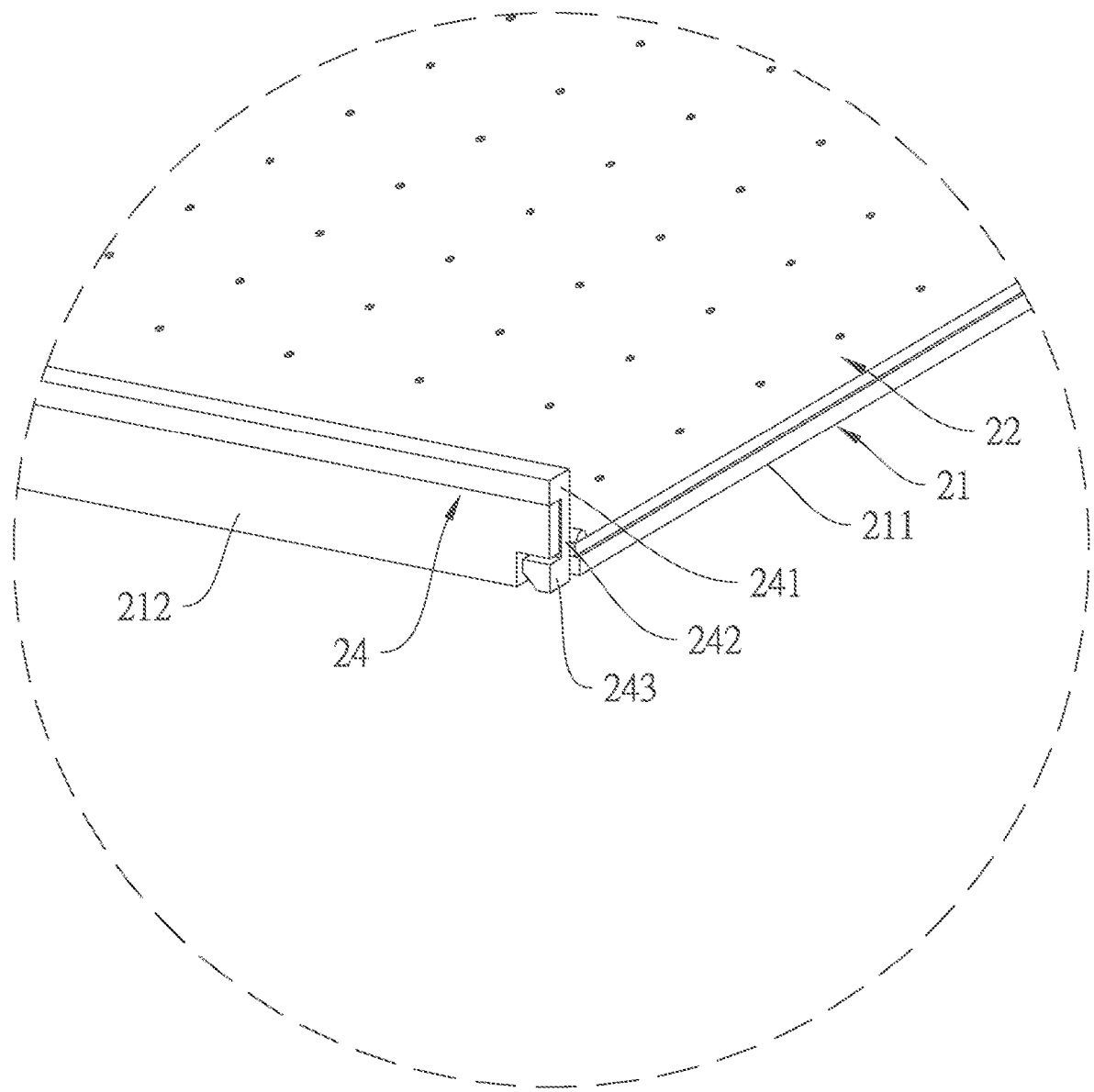
FIG. 4 is a cross-sectional diagram to assist in explaining FIG. 3.
Figure 5:
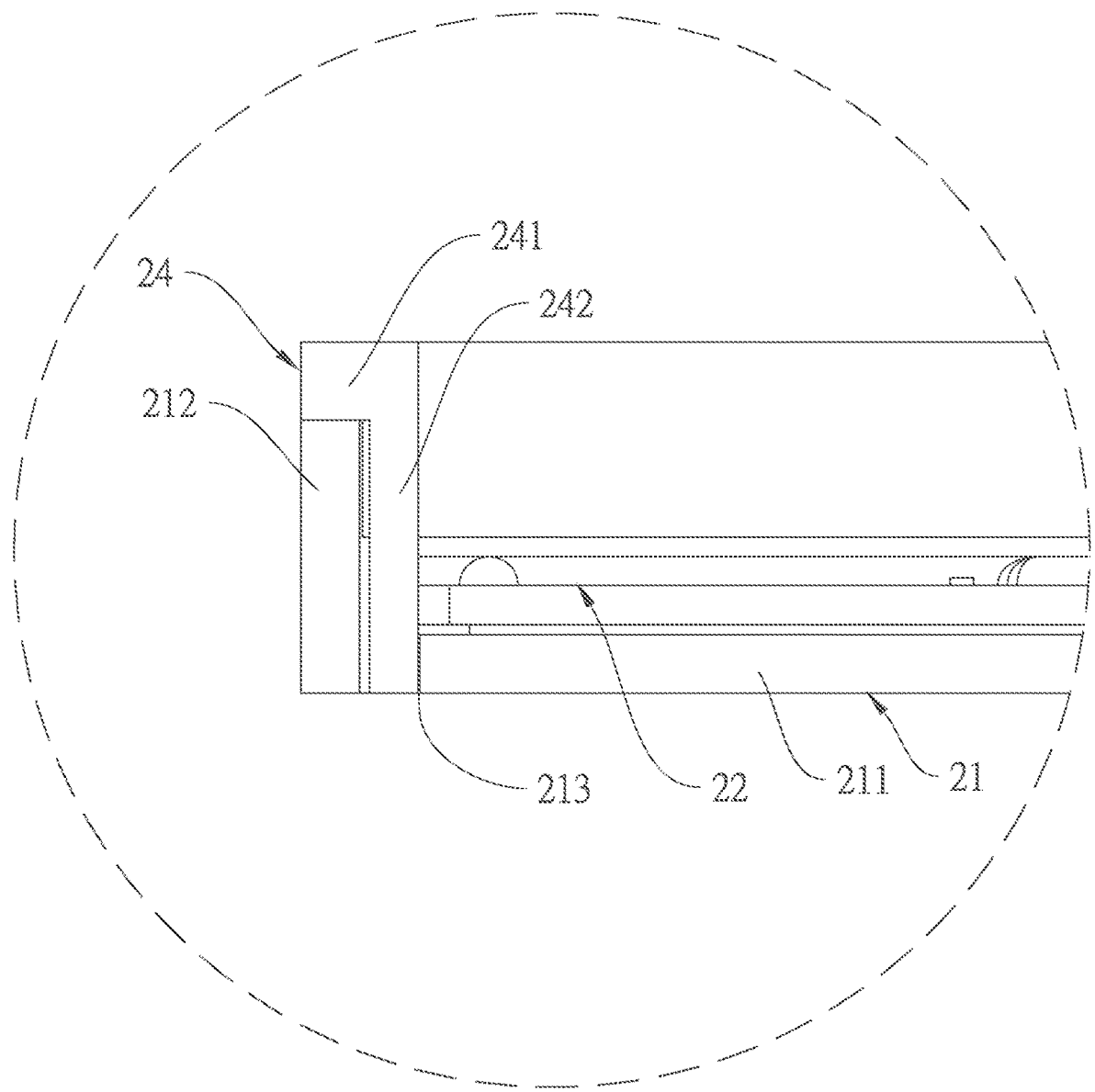
FIG. 5 is a cross-sectional diagram illustrating another combination model of a back frame and a fixing frame in the preferred embodiment.

Referring to FIG. 5, in some embodiments, each of the positioning portions 242 of the fixing frame 24 can also be tightly fitted with the corresponding perforation 213 of the back frame 21 without the need of the hook portion 243 (See FIG. 4). Thereby, the structure and manufacturing process of the fixing frame 24 can be simplified.

In addition, each of the through portions 221 is inwardly recessed from the edge of the light board 22, and the position of each of the through portions 221 is corresponding to each of the perforations 213 of the back frame 21. As shown in FIG. 2, the light-emitting elements 23 are arranged on the light board 22 in an array. Each of the through portions 221 is located between adjacent light-emitting elements 23. In this way, the edge of the light board 22 can directly touch the side wall part 212 of the back frame 21 except for each through portions 221. The through portions 221 recessed inward from the edge of the light board 22 will not affect the circuit layout and optical effect of the light board 22. At the same time, the partial structure of the fixing frame 24 does not need to be excessively extended in the accommodating space 210 away from the edge of the light board 22, so as to avoid the increase of the width of the fixing frame 24 and achieving the effect of positioning engagement and reducing the width of the frame. The above-mentioned design can reduce the dark shadows formed around conventional light board under the narrow frame structure. In addition, by utilizing the space design that each through portion 221 is located between adjacent light-emitting elements 23, a back frame that can reduce the frame width to the limit width has been successfully designed.

Figure 6:
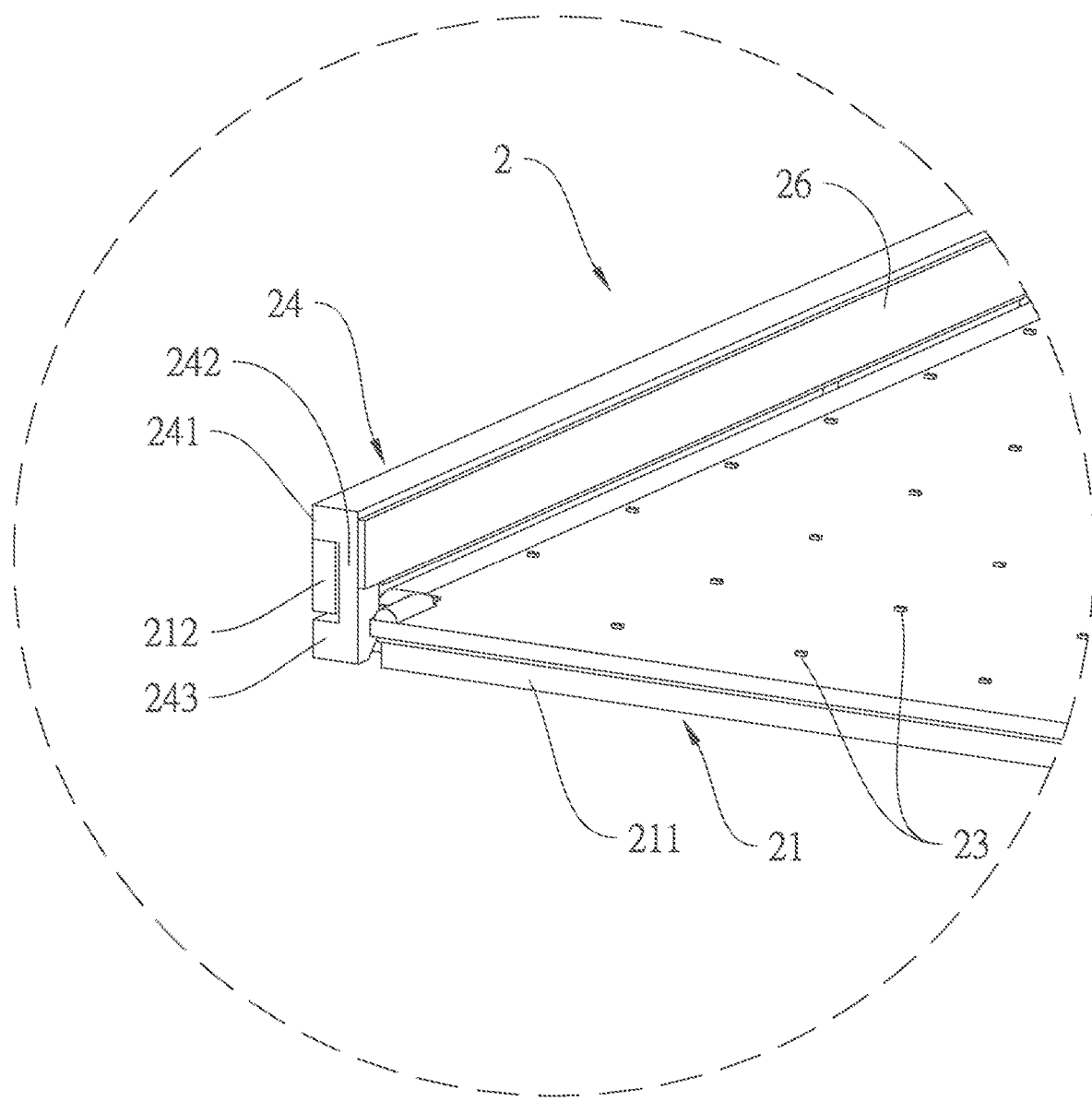
FIG. 6 is a perspective diagram illustrating the preferred embodiment further comprises a reflective sheet, and the setting position of the reflective sheet.

In addition, referring to FIG. 2, the surface of the fixing frame 24 facing the accommodating space 210 of the back frame 21 is a white surface with high reflectivity, so as to reflect the light of the light-emitting elements 23. In some embodiments, as shown in FIG. 6, the backlight module 2 can further includes a reflective sheet 26, and a part of the reflective sheet 26 is arranged on the frame body 241 of the fixing frame 24 to reflect the light of the light-emitting elements 23.

Figure 7:
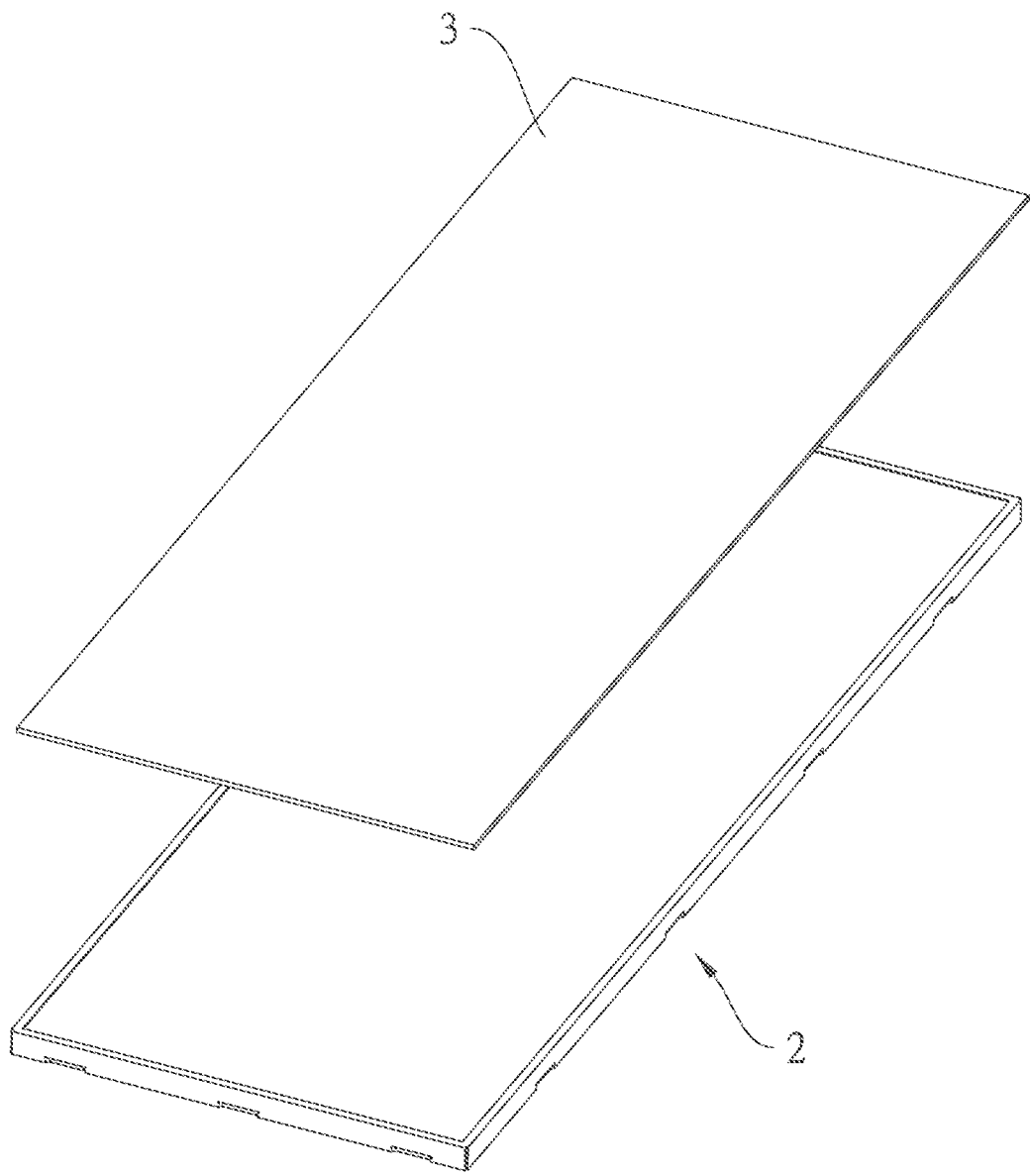
FIG. 7 is an exploded diagram of a display device according to a preferred embodiment of this invention.

As shown in FIG. 7, a display device includes the backlight module 2 and a display panel 3 disposed on the backlight module 2. The above design can not only be applied to small and medium-sized direct-lit backlight modules, but also can be used for products of other sizes.

To sum up, in the backlight module and the display device of the present invention, the effect of a narrow frame can be effectively achieved by arranging the joint part of the fixing frame 24 and the back frame 21 on the inner side of the back frame 21 and forming the through portion 221 on the edge of the light board 22 to be engaged with the joint part of the fixing frame 24 and the back frame 21. In addition, the design of the hook portions 243 and the gaps 244 of the fixing frame 24 makes the fixing frame 24 easy to be disassembled from the back frame 21 for rework, which can indeed achieve the purpose of the present invention.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
a back frame with at least one perforation;
a LED board, arranged on the back frame and having at least one through portion, wherein the position of the at least one through portion corresponds to the position of the at least one perforation of the back frame;
a plurality of light-emitting elements, arranged on the LED board at intervals;
a fixing frame, combined with the back frame, wherein a part of the fixing frame is positioned in the at least one perforation of the back frame through the at least one through portion of the LED board; and
multiple optical films, stacked on the fixing frame;
wherein the LED board is electric conducted with the plurality of light-emitting elements to emit light outward without propagating light within the LED board;
wherein a joint part of the fixing frame and the back frame on the inner side of the back frame is arranging on the inner side of the back frame;
wherein the at least one through portion of the LED board is recessed inwardly from the edge of the LED board, and the through portion on the edge of the LED board is engaged with the joint part of the fixing frame and the back frame.

2. The backlight module as claimed in claim 1, wherein the back frame includes a body part and a side wall part arranged on the body part, the body part and the side wall part jointly surround an accommodating space, and the LED board is arranged on the body part and located in the accommodating space, wherein the at least one perforation of the back frame is provided at the junction of the body part and the side wall part.

3. The backlight module as claimed in claim 2, wherein the fixing frame includes a frame body, at least one positioning portion extending from the frame body, and at least one hook portion disposed at the end of the positioning portion, the at least one positioning portion and the at least one hook portion of the fixing frame extend into the at least one perforation of the back frame, and the at least one hook portion is engaged with the side wall part of the back frame.

4. The backlight module as claimed in claim 3, wherein the hook portion of the fixing frame protrudes toward the side wall part of the back frame and extends into the at least one perforation of the back frame and abuts against the side wall part.

5. The backlight module as claimed in claim 3, wherein the frame body of the fixing frame is carried on the side wall part of the back frame, and the at least one positioning portion of the fixing frame extends inner side of the side wall part of the back frame and located in the accommodating space.

6. The backlight module as claimed in claim 3, wherein the fixing frame also has at least one space formed on one side of the at least one positioning portion, so that the at least one positioning portion can be deformed relative to the frame body.

7. The backlight module m as claimed in claim 2, wherein the surface of the fixing frame facing the accommodating space of the back frame is a white surface.

8. The backlight module as claimed in claim 2, wherein the backlight module further includes a reflective sheet, and a part of the reflective sheet is arranged on the frame body of the fixing frame.

9. The backlight module as claimed in claim 1, wherein the fixing frame includes a frame body, and at least one positioning portion extending from the frame body toward the LED board, and the at least one positioning portion passes through the at least one through portion of the LED board and is positioned in the at least one perforation of the back frame.

10. The backlight module as claimed in claim 1, wherein the light-emitting elements are arranged in an array on the LED board, and the at least one through portion is located between adjacent light-emitting elements.

11. A display device, comprising the backlight module as described in claim 1, and a display panel arranged on the backlight module.

* * * * *